June 24, 1952     G. E. KLOCK     2,601,617
METHOD AND APPARATUS FOR FORMING SANITARY NAPKIN ATTACHMENT LOOPS
Filed April 1, 1948     2 SHEETS—SHEET 1
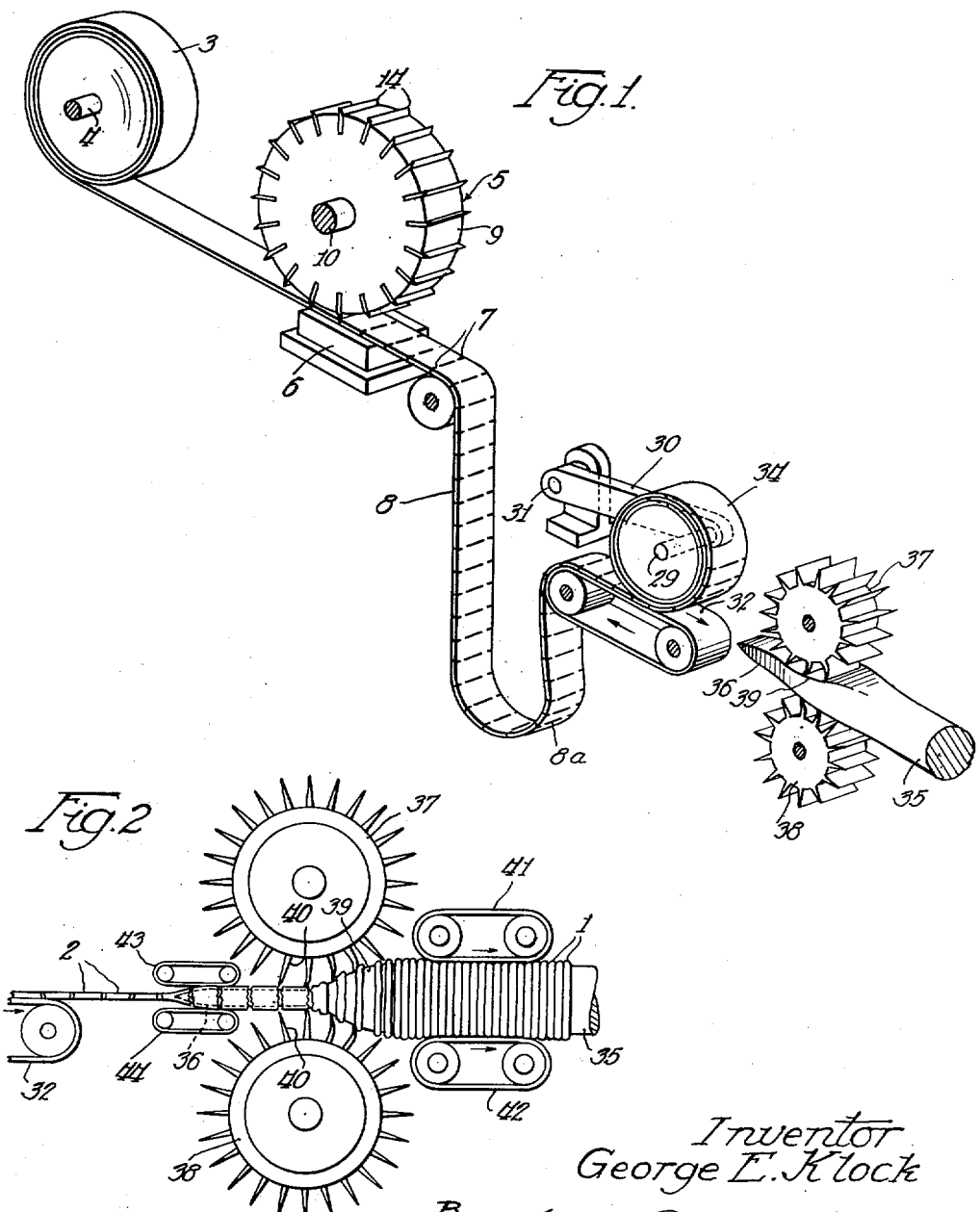
Inventor
George E. Klock
By: Soans, Pond & Anderson
Attys.

June 24, 1952 — G. E. KLOCK — 2,601,617
METHOD AND APPARATUS FOR FORMING SANITARY NAPKIN ATTACHMENT LOOPS
Filed April 1, 1948 — 2 SHEETS—SHEET 2

Inventor
George E. Klock
By Evans, Pond & Anderson
Attys

Patented June 24, 1952

2,601,617

UNITED STATES PATENT OFFICE 2,601,617

METHOD AND APPARATUS FOR FORMING SANITARY NAPKIN ATTACHMENT LOOPS

George E. Klock, Kenmore, N. Y., assignor to International Cellucotton Products Company, Chicago, Ill., a corporation of Delaware Application April 1, 1948, Serial No. 18,424

14 Claims. (Cl. 28—1)

1

This invention relates to a method and apparatus for preparing attachment loops for absorbent bandages, such as catamenial napkins.

It is the main object of the present invention to provide an improved method and apparatus for preparing cord-like loops for subsequent attachment to sanitary napkins; to provide such a method and apparatus which will lend itself to automatic operation; to provide apparatus of relatively simple character which will operate with high efficiency to produce attachment loops for the purpose set forth; and, in general, it is the object of the invention to provide an efficient, practical, and automatic method and apparatus for producing cord-like loops for attachment to sanitary napkins.

Other objects and advantages of the invention will be understood by reference to the following specification and accompanying drawings (2 sheets) wherein there is illustrated the improved method and a selected embodiment of apparatus for preparing cord-like loops according to the improved method.

In the drawings:

Fig. 1 is a perspective illustrating the general arrangement of apparatus for preparing the cord-like loops;

Fig. 2 is a side elevation of a portion of the apparatus shown also in Fig. 1;

Figure 3:
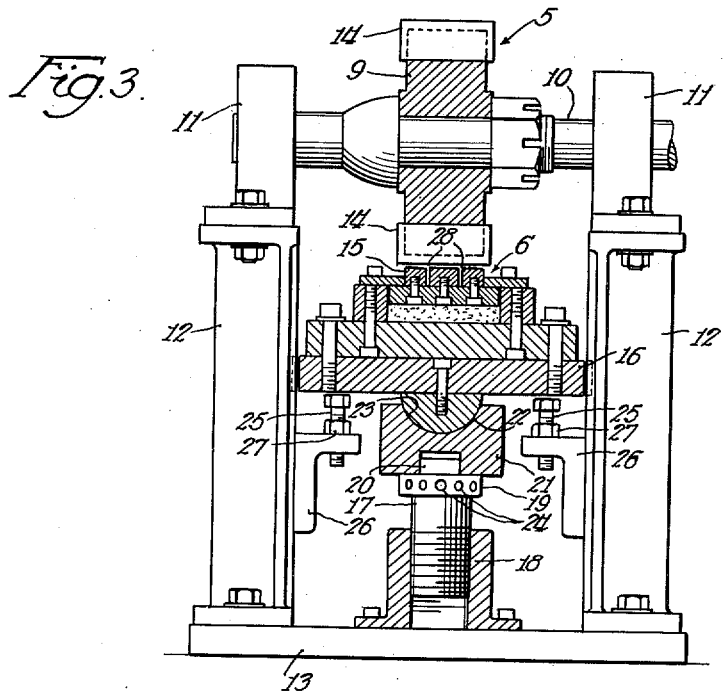
Fig. 3 is a cross section through a portion of the apparatus shown also in Fig. 1.
Figure 4:
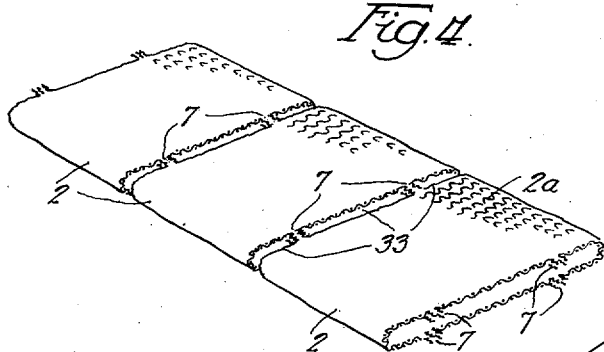
Fig. 4 is a fragmentary illustration of the material in the condition in which it is delivered by a portion of the mechanism.
Figure 5:
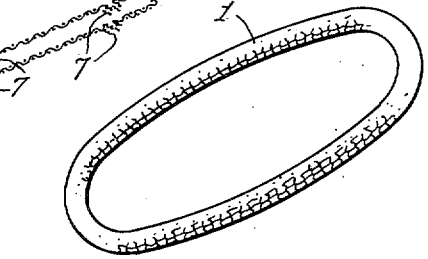
Fig. 5 is a perspective illustrating the finished form of an attachment loop made according to the present invention.

The attachment loop shown in Fig. 5 is an endless cord-like loop 1 which is formed from a section of tubular knitted material. Such a loop may be formed from a section 2 of tubular knitted material taken from a length of such material, in which the wales of the knitted material extend lengthwise of the tubing as indicated at 2a, so that the tubing is stretchable transversely but not in the direction of its length. A section of tubular knitted material, such as represented by the section 2 in Fig. 4, may be made into the cord-like form illustrated in Fig. 5 by merely distending and stretching the section crosswise of its length or axis. Because of the characteristics of knitted material, the section will roll upon itself in the direction of its length while being stretched transversely and as an incident to such stretching. This characteristic of knitted tubular material lends such material to the production of attachment loops, such as the loop 1. Loops so formed are very soft and flexible in character so that they are well adapted for sanitary napkin attachment loop purposes.

To produce the described loops from tubular knitted material, a roll 3 of collapsed, flattened tubular knitted material is suitably mounted on a spindle 4 in such a manner that the length of tubing may be easily withdrawn from the roll. The tubing length is passed between a rotary cutter 5 and a cooperating anvil 6 which operate to partially sever the tubing transversely. The cooperating cutter and anvil are so formed that the tubing is only partially severed in such a manner that small bonds 7 are left between the sections of tubing on opposite sides of each line of partial severance. From the cutting mechanism the partially severed tubing 8 may be fed to mechanism for rewinding the severed tubing into a roll for subsequent use, or it may be fed directly to mechanism for distending the severed tubing, separating the sections thereof and expanding or stretching the same into the form of cord-like loops such as represented at 1 in Fig. 5.

The cutting roll 5 of the severing mechanism consists of a roll or drum 9 mounted on a shaft 10 which is suitably journaled in bearings 11, the bearings being supported on suitable frame posts 12 which extend upwardly from a base 13. The shaft 10 with the roll 9 securely mounted thereon, may be rotated at the desired speed by any suitable drive means (not shown). The roll is equipped with a series of circumferentially spaced cutting plates or knives 14 which are anchored in the roll and extend in the direction of the axis thereof. The knives may be formed separately and detachably mounted in the roll, or they may be formed integral with the roll, so that the cutter is somewhat similar to a conventional milling cutter used in the metal working arts.

The anvil 6 consists of a hardened steel block 15 suitably mounted on a bed plate 16. The bed plate is vertically slidably guided by suitable rib and slot formations in the edges of the bed plate and on the adjacent faces of the posts 12 and it is vertically adjustably supported by means of a screw post 17. The screw post is threaded into a socket 18 which extends upwardly from the base and the upper end of said screw post is provided with a collar 19 and a reduced diameter extension 20 which fits into a socket in a thrust block 21. The thrust block 21 has an approximately semi-spherical socket 22 in its upper face which receives a corresponding semi-spherical projection 23 which depends from the bed plate 16. This arrangement permits the bed plate to have universal rocking movement on the upper end of the thrust block 21.

The collar 19 is provided with spanner wrench openings 24 or other suitable means whereby the screw post 17 may be rotated to effect adjustment of the overlying parts up or down as may be desired. For leveling the bed plate 16 and the parts supported thereon, there are provided adjusting screws represented at 25, which are threaded into suitable brackets 26 carried by the frame posts 12. The screws 25 have headed upper ends bearing against the under side of the bed plate and lock nuts 27 for engaging the upper faces of the brackets 26 to lock the respective screws in the desired position of vertical adjustment.

The anvil block 15 is provided with a pair of slots 28 in its upper surface, these slots being spaced in accordance with the desired distance between the bonds 7 in each line of slitting in the tubing. It will be seen that because of the presence of the slots 28, the cutting effect of the successive, continuous edged knives 14 will be interrupted for a distance corresponding substantially to the width of the said slots. This width is made such that an adequate but easily broken bond will remain between the tubing sections on opposite sides of each line of severance. In one embodiment of the structure, the slots are approximately $\frac{1}{16}$" wide and the slots extend the full length of the anvil which is approximately 3 inches. The slots are spaced $\frac{3}{4}$" apart for severing tubing which, when collapsed to flattened tape-like form, measures about 1½ inches in width, the slots being approximately centered with reference to the width of the collapsed tubing fed over the anvil. This arrangement produces the partially severed tubing illustrated in Fig. 4 wherein four bonds 7 remain between the adjacent sections of tubing, i. e. 2 bonds in each ply. The lines of severance may, in one embodiment, be spaced about one inch to 1¼ inches apart. The various dimensions just referred to are not critical and may be considerably varied.

As shown in Fig. 1, the partially severed length of tubing 8 may be fed under a spindle 29 which is carried by an arm 30. The arm is pivoted as shown at 31 on a suitable support so that the spindle 29 may gravitate toward an underlying belt 32. The belt 32 is continuously driven by any suitable means (not shown) in the direction indicated in Fig. 1, so that the belt will feed the slitted tubing away from the slitting mechanism and wind such tubing in a roll on the spindle. The rolling of the tubing on the spindle may be manually initiated. The belt is driven at the same speed that the tubing issues from between the cutter 5 and anvil 6.

It is preferable that the partially severed tube 8 be permitted to hang in a loop 8a between the cutting mechanism 5 and 6 and the rewinding belt and spindle so that the partially severed material will not be subjected to any significant lengthwise tension which would tend to break or pull out the small bonds 7.

Figure 6:
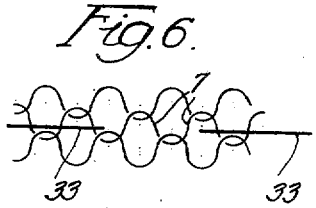
Fig. 6 is a diagrammatic illustration of a detail of slitted tubing produced according to the invention.

Each bond 7 consists of a short length of thread, usually constituting one or two links of knitting, which can be easily pulled out. The bonds 7 remain intermediate the adjacent ends of aligned slit portions 33 (see Figs. 4 and 6) which extend transversely of the tubing and through both plies of the flattened or collapsed tubing. From an examination of Fig. 6 it can be seen that the bond 7 consists of a short length of thread having free or unanchored ends. This bond thread can easily slip out of one of the two sections which it connects, a relatively light pull being sufficient to effect separation of the sections by pulling out the bond as indicated.

Instead of rewinding the partially severed tubing into a roll 34 for subsequent use, the tubing may be directed over said continuously driven belt or conveyor 32 and around a mandrel 35 of suitable round or oval cross section having a tapered receiving end portion 36 onto which the tube 8 is directed. The normal diameter of the mandrel 36 is somewhat larger than the inside diameter of the finished loop 1 so that each section of the tubular material is stretched as it is advanced along the mandrel to an enlarged diameter from which it may contract slightly to the desired finished loop diameter.

A pair of feeding wheels 37 and 38 are associated with a portion of the mandrel to effect feeding of the tubing 8 over the receiving end of the mandrel, separation of the sections of said tubing into relatively independent separate sections, advancement of the sections successively over an intermediate, expanding portion 39 of the mandrel, and delivery of the stretched and rolled loops to a loop collecting or storage section of the mandrel.

When the tubing is to be broken into sections and stretched into cord-like loops for attachment to the ends of sanitary napkins, the end of the tubing taken either directly from the slitting mechanism or from a supply roll, such as the roll 14, is fed over the tapered end portion 36 of the mandrel 35, such feeding being started manually. The partially severed tubing may, of course, be manually started over the mandrel to such a point that the leading section of the tubing will be engaged by a pair of opposed fingers 40 of the upper and lower rotary feeders 37 and 38. These fingers engage the tubing and serve both to break the leading sections from the length of tubing and to continue the advancing movement of the tubing on the receiving end portion of the mandrel. It will be understood that while the bonds between adjacent sections of the tubing are easily broken, there is nevertheless sufficient drag on the following portion of the tubing to cause it to advance on the receiving end portion of the mandrel. Successive pairs of fingers 40 are thereby enabled to engage successive tubing sections to continue the breaking of end sections from the tubing and feeding of the tubing on the mandrel.

The rotary members 37 and 38 and their fingers 40, at least the latter, are constructed of soft, flexible rubber which will yield to and more or less conform to the contour of the portion of the mandrel between the members. These feeding members are so arranged that they will not only feed the tubing on the mandrel and break the sections apart but will also feed the separated sections forwardly over the expander portion 39 of the mandrel whereby the sections are stretched and caused to roll upon themselves into cord-like form. As the stretching and rolling of the tubing progresses over the expander portion 39 the fingers of the tubing feed or breaker rolls 37 and 38 pass over the tube sections so that successive fingers engage each separated section to push it along the mandrel. The action is more or less a brushing action whereby the separated sections are frictionally brushed along the expander of the mandrel and caused to roll on themselves.

A pair of feed belts 41 and 42 are desirably associated with the mandrel closely adjacent the zone of operation of the breaker rolls 37 and 38. These feed belts are suitably driven at a continuous rate of speed and serve to feed the stretched and corded loops along the mandrel which guides the loops to mechanism for automatically applying the loops to the napkins.

Instead of employing the tube separating and expanding mechanism in direct association with the slitting mechanism as described, the tubing may be supplied to the separating and expanding mechanism from rolls such as the roll 34. Such a roll may be supported on a suitable spindle or other support and delivered directly to the receiving end of the mandrel or to a feeding belt or roll mechanism (not shown) and thence to the mandrel. In either procedure, the bonds remaining between the tubing sections are strong enough to maintain the continuity of the tubing until it is delivered to the mandrel and the action of the feeders 37 and 38. As the tubing advances on the mandrel the frictional resistance to its movement gradually increases especially as the expander portion of the mandrel is encountered so that there is sufficient resistance to continued movement of the tubing over the mandrel to enable the breaker wheels to pull the leading section of the tubing from the following portion thereof.

In some instances, a pair of suitably driven feed belts represented at 43 and 44 (Fig. 2) may also be associated with the receiving end portion of the mandrel to deliver the partially severed tubing to said receiving portion of the mandrel. Such belts should overlap the receiving end portion of the mandrel so as to exert very light pressure on the tubing between the respective belts and the mandrel, thereby to more or less relieve the bonds 7 of pull incident to the initial portion of the movement of the tubing over the mandrel.

The described structure is of simple character, continuous and quiet in operation, and highly efficient. It is flexible in that the tubing may be slitted and stretched as a continuing operation, and the stretched or corded loops fed directly to mechanism whereby they are attached to the ends of a sanitary napkin, or the tubing may be slit and stored in the form of supply rolls of slitted tubing ready for subsequent separation and conversion into cord-like loops. Various changes may be made in the described structure without departing from the invention.

I claim:

1. Apparatus for preparing loops for attachment to sanitary napkin tabs or the like, comprising cooperating cutting elements arranged to cut a length of tubing transversely and provided with means for causing the line of severance to be interrupted so as to leave readily breakable spaced bonds interconnecting the tube sections on opposite sides of each line of severance, and means for effecting winding of such severed tubing into a roll.

2. Apparatus for preparing loops for attachment to sanitary napkin tabs or the like, comprising cooperating cutting elements arranged to cut a length of knit tubing transversely and provided with means for causing the line of severance to be interrupted so as to leave readily breakable spaced bonds interconnecting the tube sections on opposite sides of each line of severance, a mandrel having a receiving end portion of reduced diameter which is gradually expanded, said severed tubing being fed to said mandrel end, and means for feeding the severed tube along said mandrel from its receiving end and operative to break said bonds so as to separate the sections one from another and to also advance said separated sections over the expanded portion of the mandrel to thereby expand said sections and to cause them to roll upon themselves into cord-like form.

3. Apparatus for preparing loops for attachment to sanitary napkin tabs or the like, comprising a rotary cutter having a series of circumferentially spaced knives projecting from its periphery and extending in the direction of the axis of the rotary member, an anvil cooperating with said knives to sever material fed between said cutter and anvil, said knives having continuous cutting edges and said anvil being provided with a recess for interrupting the cuts produced by said knives to thereby provide bonds between the material sections on opposite sides of the lines of severance, and means for receiving said severed material and winding the same into a roll.

4. In apparatus of the class described, a mandrel having a tapered portion adapted to enter and distend collapsed tubing which is partially severed transversely in such a manner as to leave easily breakable bonds connecting the sections of the material on opposite sides of the lines of severance, and means for engaging the leading end portion of the distended material on said mandrel so as to advance the same along said mandrel and thereby incidentally break the bonds connecting the successive sections of the tube to thereby complete the severance of said sections, said engaging means comprising a rotary member having a plurality of fingers of resilient flexible material which are successively engageable with said material as an incident to rotation of the member.

5. In apparatus of the class described, a mandrel having a tapered portion adapted to enter and distend collapsed knitted tubing which is partially severed transversely in such a manner as to leave easily breakable bonds connecting the sections of the material on opposite sides of the lines of severance and means for engaging the distended material on said mandrel so as to advance the same along said mandrel and thereby incidentally break the bonds connecting the successive sections of the tube to thereby complete the severance of said sections, said mandrel having a portion of gradually increased diameter over which said sections are fed by said engaging means to thereby effect stretching of said sections so as to cause the same to roll upon themselves into cord-like form.

6. In apparatus of the class described, a mandrel having a tapered portion adapted to enter and distend collapsed knitted tubing which is partially severed transversely in such a manner as to leave easily breakable bonds connecting the sections of the material on opposite sides of the lines of severance, means for engaging the distended material on said mandrel so as to advance the same along said mandrel and thereby incidentally break the bonds connecting the successive sections of the tube to thereby complete the severance of said sections, said mandrel having a portion of gradually increased diameter over which said sections are fed by said engaging means to thereby effect stretching of said sections so as to cause the same to roll upon themselves into cord-like form, and means for feeding said stretched loops along said mandrel.

7. Apparatus, according to claim 4, wherein the material feeding means consists of a pair of rolls, each having flexible fingers projecting from their peripheries and arranged on opposite sides of said mandrel to successively engage opposed portions of said tubular material as an incident to rotation of said rolls.

8. Material for preparing attachment loops for sanitary napkins, comprising knitted tubular material which is partially severed along transversely extending lines which are spaced lengthwise of the length of tubing, the lines of severance extending in the direction of the threads in the material and being incomplete so as to leave short thread lengths interconnecting the sections of the material on opposite sides of the lines of severance, whereby the sections are readily separable from each other by pulling said short thread lengths away from either of a pair of adjacent sections as a part of the other thereof.

9. A method of producing endless, cord-like, textile material loops, comprising the steps of providing a length of continuously uniformly knitted tubing in flattened collapsed condition, cutting through both plies of the flattened tube discontinuously across the width thereof and adjacent an end of said length of tubing so as to leave at least one bond consisting of one or more knit-formed links which may be easily pulled out of the tubing, whereby an end portion of the length of tubing may be easily separated from the length of tubing but remains integrally connected thereto.

10. A method of producing endless, cord-like, textile material loops, comprising the steps of providing a length of continuously uniformly knitted tubing in flattened collapsed condition, cutting through both plies of the flattened tube discontinuously across the width thereof at predetermined spaced intervals so as to demarcate tube sections of predetermined length, the discontinuity of the lines of severance being such as to leave in each line of severance at least one or more knit-formed links which may be easily pulled out of the tubing, whereby said tube sections remain integrally connected but are easily separable.

11. A method of producing endless, cord-like, textile material loops, comprising the steps of providing a length of continuously uniformly knitted tubing in flattened collapsed condition, cutting through both plies of the flattened tube discontinuously across the width thereof and adjacent an end of said length of tubing so as to leave at least one bond consisting of one or more knit-formed links which may be easily pulled out of the tubing, separating such end portion from said tubing length, and distending and stretching the separated section transversely of the axis of the section, whereby said section is caused to roll upon itself into cord-like form.

12. A method of producing endless, cord-like, textile material loops, comprising the steps of providing a length of continuously uniformly knitted tubing in flattened collapsed condition, cutting through both plies of the flattened tube discontinuously across the width thereof at predetermined spaced intervals so as to demarcate tube sections of predetermined length, the discontinuity of the lines of severance being such as to leave in each line of severance at least one or more knit-formed links which may be easily pulled out of the tubing, whereby said tube sections remain integrally connected but are easily separable, successively separating from said length of tubing, the end sections thereof, and distending and stretching the separated sections transversely of the axes of the sections whereby said sections are caused to roll upon themselves into cord-like form.

13. Apparatus for preparing sanitary napkin attachment loops, comprising cooperating cutting elements for cutting a length of tubing transversely at predetermined longitudinally spaced points to demarcate successive tube sections, said cutting elements being such as to provide discontinuous lines of severance leaving readily breakable spaced bonds interconnecting the tube sections on opposite sides of each line of severance, said cutting elements being operative to sever flattened tubular knit material, a mandrel having a tapered receiving end portion adapted to enter and distend said severed collapsed tubing, and means for engaging the distended tubing on said mandrel and effecting separation from the tubing of end sections thereof and advancement of such sections along said mandrel, said mandrel having a portion of gradually expanding cross section over which said sections are advanced as aforesaid, and whereby said sections are stretched transversely and thereby caused to roll upon themselves into cord-like form.

14. Sanitary napkin attachment loop material comprising tubular knitted material collapsed to flat, tape-like condition, said flattened tube being partially severed transversely at longitudinally spaced points in such a manner as to leave bonds consisting of one or more knit-formed loops interconnecting the sections of the material on opposite sides of the lines of partial severance, said interconnecting loops in said bonds being few enough in number to permit the respective bonds to be easily withdrawn from the material as an incident to oppositely directed forces exerted on sections on opposite sides of a line of severance.

GEORGE E. KLOCK.

REFERENCES CITED

The following references are of record in the file of this patent:

UNITED STATES PATENTS

| Number | Name | Date |
| --- | --- | --- |
| 966,408 | Hollingsworth | Aug. 2, 1910 |
| 1,424,458 | Fleisher | Aug. 1, 1922 |
| 1,545,536 | Waite | July 14, 1925 |
| 1,923,551 | Murphy | Aug. 22, 1933 |
| 2,052,076 | Boles | Aug. 25, 1936 |
| 2,112,395 | Clack | Mar. 29, 1938 |
| 2,191,497 | Potdevin | Feb. 27, 1940 |
| 2,244,560 | Leavenworth | June 3, 1941 |
| 2,411,259 | Gilbreath | Nov. 19, 1946 |
| 2,444,463 | Nordquist | July 6, 1948 |
| 2,515,687 | Bausher | July 18, 1950 |